(12) United States Patent
Andersen

(10) Patent No.: US 12,411,387 B2
(45) Date of Patent: *Sep. 9, 2025

(54) LIGHT SOURCE

(71) Applicant: NKT PHOTONICS A/S, Birkerød (DK)

(72) Inventor: Thomas Vestergaard Andersen, Birkerød (DK)

(73) Assignee: NKT PHOTONICS A/S, Birkerød (DK)

( * ) Notice: Subject to any disclaimer, the term of this patent is extended or adjusted under 35 U.S.C. 154(b) by 121 days.

This patent is subject to a terminal disclaimer.

(21) Appl. No.: 17/786,833

(22) PCT Filed: Dec. 21, 2020

(86) PCT No.: PCT/DK2020/050402
§ 371 (c)(1),
(2) Date: Jun. 17, 2022

(87) PCT Pub. No.: WO2021/121529
PCT Pub. Date: Jun. 24, 2021

(65) Prior Publication Data
US 2023/0375897 A1 Nov. 23, 2023

(30) Foreign Application Priority Data
Dec. 19, 2019 (DK) .............. PA201970801

(51) Int. Cl.
*G02B 6/00* (2006.01)
*G02F 1/35* (2006.01)
(Continued)

(52) U.S. Cl.
CPC ............ *G02F 1/365* (2013.01); *G02F 1/3528* (2021.01); *H01S 3/1001* (2019.08); *H01S 3/10038* (2013.01)

(58) Field of Classification Search
CPC ........ G02F 1/3528; G02F 1/365; G02F 1/212; H01S 3/10046; H01S 3/1001; H01S 3/10038; G02B 6/00
See application file for complete search history.

(56) References Cited

U.S. PATENT DOCUMENTS 6,341,031 B1 * 1/2002 McBrien .................. G02F 2/00
385/9
7,982,943 B2 * 7/2011 Okuno .................. G02F 1/3513
359/341.1

(Continued)

FOREIGN PATENT DOCUMENTS

EP 1925975 A1 5/2008
EP 2953215 A1 12/2015
(Continued)

OTHER PUBLICATIONS

Danish Search Report dated Jun. 22, 2020, issued by the Danish Patent Office in corresponding Application No. PA 2019 70800. (9 pages).

(Continued)

*Primary Examiner* — Jennifer Doan
(74) *Attorney, Agent, or Firm* — Boone IP Law (57) ABSTRACT

A light source, including: a pulse generator for providing an initial sequence of light pulses, the initial sequence of light pulses including an initial number of light pulses within a predetermined time period, first and second optical arms, for propagating, respectively, first and second sequences of light pulses, each derived from the initial sequence of light pulses, wherein the first optical arm includes a first manipulator configured to generate the first sequence of light pulses from the initial sequence of light pulses, wherein the light source includes a nonlinear optical element arranged to receive the first sequence of light pulses or the second sequence of light pulses, and an optical switch arranged to switch that either (Continued)

the first sequence of light pulses or the second sequence of light pulses is received by the nonlinear optical element.

19 Claims, 5 Drawing Sheets

(51) Int. Cl.
  *G02F 1/365* (2006.01)
  *H01S 3/10* (2006.01)

(56) References Cited

U.S. PATENT DOCUMENTS

| | | |
|---|---|---|
| 8,902,495 B2 | 12/2014 | Clowes et al. |
| 2005/0226576 A1 | 10/2005 | Feder |
| 2009/0095890 A1 | 4/2009 | Tanaka |
| 2009/0097512 A1 | 4/2009 | Clowes et al. |
| 2011/0062127 A1 | 3/2011 | Gu et al. |
| 2011/0116282 A1 | 5/2011 | Okuno |
| 2013/0177031 A1 | 7/2013 | Almeida et al. |
| 2014/0204456 A1 | 7/2014 | Chavez-Pirson et al. |
| 2015/0192732 A1 | 7/2015 | Moselund |
| 2017/0131556 A1 | 5/2017 | Salama |
| 2018/0217323 A1 | 8/2018 | Lyngsø~e et al. |
| 2019/0103721 A1 | 4/2019 | Ni |
| 2019/0267767 A1 | 8/2019 | Krausz |
| 2022/0149579 A1 | 5/2022 | Yusim |
| 2022/0247143 A1 | 8/2022 | Abdolvand |
| 2022/0337017 A1 | 10/2022 | Michailovas |
| 2023/0023430 A1 | 1/2023 | Andersen |
| 2023/0033071 A1 | 2/2023 | Andersen |

FOREIGN PATENT DOCUMENTS

| | | |
|---|---|---|
| JP | 2007193230 A | 8/2007 |
| JP | 2018146971 A | 9/2018 |
| WO | 2007083660 A1 | 7/2007 |
| WO | 2011146407 A2 | 11/2011 |
| WO | 2013104029 A1 | 7/2013 |
| WO | 2013178232 A1 | 12/2013 |

OTHER PUBLICATIONS

Danish Search Report dated Jun. 12, 2022, issued by the Danish Patent Office in corresponding Application No. PA 2019 70801. (9 pages).
Danish Search Report dated Jun. 15, 2022, issued by the Danish Patent Office in corresponding Application No. PA 2019 70802. (10 pages).
International Search Report (PCT/ISA/210) and Written Opinion (PCT/ISA/237) mailed on Mar. 24, 2021, by the European Patent Office as the International Searching Authority for International Application No. PCT/DK2020/050403. (15 pages).
International Search Report (PCT/ISA/210) and Written Opinion (PCT/ISA/237) mailed on Mar. 26, 2021, by the European Patent Office as the International Searching Authority for International Application No. PCT/DK2020/050404. (14 pages).
International Search Report (PCT/ISA/210) and Written Opinion (PCT/ISA/237) mailed on Mar. 30, 2021, by the European Patent Office as the International Searching Authority for International Application No. PCT/DK2020/050402. (13 pages).
International Preliminary Report on Patentability (From PCT/IB/373), Notification Concerning Transmittal of Internaitonal Preliminary Report on Patentability(Form PCT/IB/326) and the Written Opinion of the International Searching Authority (Form PCT/IB/373) issued on Jun. 30, 2022, by the International Bureau of WIPO, in corresponding International Application No. PCT/DK2020/050402. (8 pages).
Office Action mailed on Jul. 31, 2024, by the Japanese Patent Office for Japanese Application No. 2022-537723, 13 pages.

* cited by examiner

Predetermined time period

FIG. 5(B)

Damage threshold (in nonlinear element)

FIG. 5(C)

Damage threshold

LIGHT SOURCE

FIELD OF INVENTION

The present invention relates to a light source, such as a light source having a broadband output and/or a light source that can operate in different modes.

BACKGROUND

A broadband light source generally refers to a light source that emits light having a broad bandwidth of wavelengths, for example, 50 nm or more. Broadband light sources can for example include incandescent or fluorescent lamps, providing a broad spectrum, typically in the range of 400 nm to 1700 nm. For such sources, however, the intensity is limited by the quality of the filament employed or the efficiency of the gas excitation. Furthermore, as the light is not spatially coherent, coupling the light into a fiber might be challenging, resulting in a low-power, low-brightness source with mediocre quality. One of more of the foregoing limitations can be less than optimal for many applications Supercontinuum generation is often able to provide improvement over one or more of the above limitations. Supercontinuum generation relates to the formation of a broad, typically continuous, spectrum through propagation of high power light, typically pulses, through a nonlinear optical element, such as a nonlinear fiber. The term supercontinuum does not cover a specific phenomenon but rather can include at least some of plethora of nonlinear effects, such as self-phase modulation, Raman scattering, phase matching and soliton generation, leading to considerable broadening of optical pulses. The spectrum achieved through supercontinuum generation in a nonlinear optical fiber typically covers a broader spectrum, for example in some instances with wavelength in the range of 400-2400 nm, with respect to incandescent or fluorescent lamps, and can provide one or more of higher intensity, single-mode beam characteristics, excellent pointing stability and the brightness of a laser.

Broadband light sources find applications in fields such as spectroscopy, Optical Coherence Tomography (OCT), metrology, scientific instrumentation, bio-imaging, semiconductor inspection and many more.

OBJECTS AND SUMMARY

It is an object of the present invention to provide a light source that can be operated in different operational modes.

It is also an object of the present invention to provide a light source which circumvents or at least reduces light induced degradation of a nonlinear fiber used to generate a broadband output.

The object is satisfied by a light source in accordance with the embodiments described below. The object can be satisfied by a source as recited in the appended claim 1, where certain preferred embodiments are disclosed in the dependent claims.

In some embodiments, a light source comprises a pulse generator for providing an initial sequence of light pulses, the initial sequence of light pulses comprising an initial number of light pulses within a predetermined time period, first and second optical arms, for propagating, respectively, first and second sequences of light pulses, each derived from the initial sequence of light pulses, wherein the first optical arm comprises a first manipulator configured to generate a first sequence of light pulses from the initial sequence of light pulses, the first sequence of light pulses having a first number of light pulses within the predetermined time period, wherein the first number is higher than the initial number, wherein the second optical arm is configured to propagate a second sequence of light pulses from the initial sequence of light pulses, the second sequence of light pulses having a second number of light pulses within the predetermined time period, wherein the second number is equal to or lower than the initial number, and wherein the light source further comprises a nonlinear optical element, where the light source is configured such the nonlinear optical element selectively receives the first sequence of light pulses or the second sequence of light pulses. The nonlinear optical element can spectrally broaden the received pulses.

The nonlinear optical element may in particular be configured to broaden the spectrum of the sequence of light pulses passing through it. Thus, the nonlinear optical element may generate a broadband or supercontinuum spectrum from the sequence of pulses.

The light source may comprise a broadband light source, such as a supercontinuum light source.

The light source can include an optical switch arranged to switch either the first sequence of light pulses or the second sequence of light pulses for reception by the nonlinear optical element. The switch can facilitate operating the light source in the high power or in the low power mode.

The high power mode may be interpreted as a mode when the supercontinuum light source delivers a total power of more than 5 W, such as more than 6 W, such as more than 10 W, and such as more than 20 W measured over the entire supercontinuum spectrum extending for example from 350 nm to 850 nm and possibly into the infrared wavelength region.

Furthermore, at least in some embodiments, generated supercontinuum light can include a total power of at least 0.5 W, 1 W, 2 W, 5 W, 10 W in the visible wavelength range from approximately 350 nm to 850 nm.

At least in some embodiments, a power mode, in particular the high power mode, can provide broadband or supercontinuum light with a high power spectral density, for example of 1 mW/nm, or 2 mW/nm, or 5 mW/nm, or 10 mW/nm, or 20 mW/nm, measured at least over a range of 10 nm within the "visible range", in particular between 350 nm to 850 nm.

At least in some embodiments, the high power mode of the supercontinuum light source can deliver a power spectral density of more than 10 mW/nm, such as more than 20 mW/nm, such as more than 25 mW/nm, such as more than 50 mW/nm measured over at least a range of 10 nm within a part of the supercontinuum spectrum extending from at least 1200 nm up to at least 1300 nm.

At least one amplifier can be arranged upstream of the nonlinear optical element, to amplify the pulses of the first or second sequence before these are delivered to the nonlinear optical element. In particular in order to provide a desired power to the nonlinear optical element.

The amplifier can be configured to amplify, depending on the settings of the switch, the first or second sequence of pulses such that the peak power of the pulses in the respective sequence of pulses remains below a predefined maximum level. Thereby, material degradation is mitigated, and a damage of the nonlinear optical element can be avoided as described below.

The light source can include a controller in communication with the optical switch and the amplifier, where the controller is configured for controlling the amplification of pulses in the first or second sequence depending on the setting of the optical switch. Preferably, a stronger amplification of the pulses in the first sequence of pulses is provided to compensate for the distribution of the optical power in the initial pulse into several pulses in the first sequence of light pulses, i.e. pulses of the first sequence are amplified more than pulses in the second sequence.

Preferably, the controller provides that the amplification of optical pulses in the first or second sequence of pulses such that the peak power of the pulses in the respective sequence of pulses remains below a predefined maximum level.

In some embodiments, the first sequence of light pulses and the second sequence of light pulses can be generated such that the peak power of the pulses in both sequences is—at least in substance—the same.

In some embodiments the energy or peak power of selected pulses can be controlled. For example, the peak power or energy of pulses fed into the nonlinear optical element can be controlled to a level which is below a predefined threshold level, i.e. below a predefined maximum level. The maximum level could be chosen such that a damage or a degradation of the nonlinear optical element does not occur or is reduced, such as reduced to within an acceptable level. Degradation of the nonlinear optical element is usually a continuous process. A high peak power or energy of pulses transmitted through the nonlinear optical element causes a higher degradation than pulses having a low peak power. The degradation rate can be nonlinear, so that a high peak power can cause severe damage or degradation to the nonlinear optical element. In other words, the predefined maximum level is set such that, for peak powers and energies below this level, the degradation of the nonlinear optical element is maintained at a sufficiently low magnitude to ensure a long life time of the nonlinear optical element and hence the light source. Thus, having more pulses with a peak power below the predefined maximum level per predetermined time period in the first sequence of light pulses can help to increase the lifetime of the nonlinear optical element and to avoid damaging the nonlinear optical element, while a high-power output and/or a high spectral energy density can be obtained in the predetermined time period.

The peak power or energy of selected pulses could be controlled to be "clamped" so as to not exceed the predefined maximum level. That is, the peak power or pulse energy could vary, such as, for example, as the number of pulses per unit time varies (to a certain extent such variation is natural when pulses are amplified; without control amplification of fewer amplified pulses per unit time can mean more energy, and hence peak power, per amplified pulse), but not allowed to vary to exceed the predefined maximum level. Also, the peak power or energy of pulses could be controlled to remain substantially the same, even as the number of pulses per unit time is varied. For example, as supercontinuum generation is responsive to the peak power, it can be advantageous to have the peak power remain the same as well as clamped below the predefined maximum level selected to reduce damage to the nonlinear optical element, where absent control or clamping the peak power or energy would be undesirably large.

As noted above, in some embodiments the peak power or energy of pulses can be controlled to remain substantially the same and/or to not exceed the predefined maximum level. Control can be desirable where, as in the present invention, the number of pulses per unit time can vary. For example, the present invention can include one or more amplifiers. Amplifiers are typically optically pumped, such as by laser diodes, to provide for energy to transfer to the light signal to amplify the signal. Very often reducing the number of pulses amplified per unit time tend to increase the energy or peak power per pulse, as the amount of energy of optical pump power delivered over the time interval is now distributed over fewer amplified pulses.

Accordingly, one way to control the optical energy or peak power of a pulse, whether for compensating for variations due to the amplifier itself or responsive to other considerations, is to control the amplification process, such as, for example, controlling the pump laser or lasers pumping the amplifier(s). For example, the optical pump power can be reduced when fewer pulses are being amplified to compensate for the typical increase in amplified pulse energy or peak power.

A variable optical attenuator or a modulator, such as an AOM (acousto optic modulator) or and EOM (electro optic modulator) could be used, in some embodiments, to control the peak power or energy of pulses.

Control of the AOM or EOM could be in conjunction with the control of amplification.

The light source can be configured for sampling pulses, for example sampling pulses using a detector. Pulses to be delivered to the nonlinear optical element can be sampled prior to their delivery, and control can be responsive to the sampled pulse energy or peak power of pulses or of a burst of pulses (e.g., where a detector is no responsive to individual pulses). It is also possible to control the peak power or energy of the pulses responsive to a look up table, or to a formula or algorithm, or responsive to selected operation of the light source. Such control can be in conjunction with, or independent of, the aforementioned feedback control using a detector. For example, when pulses are directed to an optical arm that increases the number or repetition rate of pulses, the pulse energy or peak power of pulses can vary, at least in part, in a predictable manner. Where a pulse manipulator includes a pulse splitter, for example, the split pulses each have less energy or peak power than the pulse from which the pulses were split off. Thus, the pulse energy of peak power of pulses can be controlled, at least in part, responsive to the optical arm that is selected to propagate pulses. When pulses are split, amplification can be adjusted, such as by being increased. In some embodiments, pulse peak or energy can be controlled responsive to a setting of the switch or switches, such as by adjusting the gain of a downstream optical amplifier to increase the pulse energy or peak power when pulses are switched so as to be split in a manipulator. Similarly, pulses can be controlled responsive to the operation of a manipulator or modulator. Depending the application, any pulses of the light source can be sampled and/or controlled, such as, for example, pulses from an optical source, the initial sequence of pulses, the first or second sequence of pulses, etc. The light source can include a controller (not shown) in appropriate communication with one or more of the aforementioned elements or components for providing the desired control.

In one embodiment, the optical switch has an input and two outputs, and is arranged to selectively provide the initial sequence of light pulses to either the first optical arm or to the second optical arm.

The first sequence of light pulses provides more pulses per predetermined time period to the nonlinear optical element than the second sequence of light pulses. When differentiated amplification of the pulses in the first and second sequences is applied to provide a stronger amplification to pulses in the first sequence, the nonlinear optical element will generate a broadband spectrum that has a higher power when the first sequence of light pulses is provided to the nonlinear optical element than the broadband spectrum generated from the second sequence of light pulses.

On the time scale of the predetermined time period, the accumulated optical signal delivered by the light source (as a sequence of supercontinua generated by the pulses of the first sequence) will appear as one high-power supercontinuum. For example, a detector having an integration time which equals or exceeds the predetermined time period will record this optical signal as one high-power supercontinuum.

Hence, the light source can be operated in a high-power mode, namely when pulses from the first optical arm are received by the nonlinear optical element, and in a low-power mode, namely when the pulses from the second optical arm are received by the nonlinear optical element. The source therefore allows the user to select in between these two operation modes, while, for example, performing spectroscopic measurement with the light source.

Thus in this embodiment it is possible to switch between different operation modes of the light source, and in particular between a high-power operation mode by setting the switch such as to provide the initial sequence of light pulses to the first optical arm and a low-power operation mode by setting the switch such as to provide the initial sequence of light pulses to the second optical arm.

In one embodiment the optical switch has two inputs and an output and is configured to receive the first sequence of light pulses and the second sequence of light pulses and to selectively provide either the first sequence of light pulses or the second sequence of light pulses to the nonlinear optical element. Thus, in dependence on the setting of the switch, a nonlinear optical element is arranged to receive the first sequence of light pulses or the second sequence of light pulses, and the light source can be selected to operate in a high power or in a low power mode.

Thus, the switch can be arranged subsequent to the first and second optical arms and receive the output from both arms. The light pulses received from an optical arm that are not provided to the nonlinear optical element can for example be guided to an optical dump.

In one embodiment the pulse generator can provide the initial sequence of light pulses to a splitter, which can comprise an optical splitter, which can be configured to provide the initial sequence of light pulses to the first and second optical arms. The intensity of the light pulses in both arms could be reduced to 50%, so that the optical splitter can be a 50/50 splitter. However, also other splitting portions are possible.

The splitter can be used in conjunction with the optical switch being arranged subsequent to the first and second optical arms described above.

In one embodiment, the switch comprises a switch having an input and an output, and one of optical arms includes such a switch inline. Where one of the optical arms includes a component that can also function as a switch, such as where the second optical arm comprises a second manipulator that can have a switching function, the other of the arms, i.e., the first arm, can comprise the switch inline. The switch and the switching function of the second manipulator can operated in opposite fashion, i.e., when one is "off" the other is "on", and vice versa.

In one embodiment, each of the optical arms comprises its own switch in line (i.e., in series with the optical path of the arm), each switch having an input and an output. The switches can be operated in opposite fashion, that is, when one is "off" the other is "on", and vice versa.

A splitter as described above can be used when one or more in line switches are used, for providing the initial sequence of light pulses to the first and second optical arms.

Thus a switch arranged to switch either the first sequence of light pulses or the second sequence of light pulses for reception by the nonlinear optical element includes, for example, a two port inline switch that switches just one of the optical arms, as well as a three port switch that can choose between the optical arms.

In comparison to the generation of a spectrum from the initial light pulses, the power of the spectrum generated from the first sequence of light pulses can be higher, as the first sequence of light pulses includes more pulses per time period and amplification has been applied to compensate for the splitting of the initial light pulses into the first sequence pulses. The distribution of the optical power generating the broadband spectrum over more pulses (in the first sequence of pulses) provides that a high-power broadband spectrum can be generated without a substantial increase in the degradation of the nonlinear optical element.

An alternative way of increasing the power of the generated spectrum is to increase the peak power of the pulses in the initial sequence of pulses. However, high peak powers of the pulses that run through the nonlinear optical element may cause an accelerated degradation of the nonlinear optical element or may even damage the nonlinear optical element. Thus, using the first optical arm and the first manipulator allows generating broadband light at a higher power while reducing the risk of damaging the nonlinear optical element.

For some applications, it is desirable to be able to choose between different operational modes of a light source, for example between a high-power operation mode and a low-power operation mode.

In fluorescence spectroscopy applications, for example, a higher intensity spectrum is required for bleaching experiments while a low intensity spectrum is required for lifetime measurements and it is desirable to be able to switch between these two operation modes.

The first manipulator may be configured to generate, from the initial sequence of light pulses with an initial repetition rate, a first sequence of light pulses having a repetition rate that is higher than the initial repetition rate. The first manipulator may, for example, be configured to double the repetition rate.

In some embodiments, the first manipulator comprises a pulse splitter configured to split each pulse of the initial sequence of light pulses into a given number of pulses, thereby generating a given number of sub-sequences of light pulses, the given number of sub-sequences of light pulses comprising a first sub-sequence of light pulses. The pulse splitter may be configured to delay each of the remaining sub-sequences of light pulses for a predetermined time period relative to the first sub-sequence of light pulses. The pulse combiner may further be configured to combine the first sub-sequence of light pulses and the further delayed sub-sequences of light pulses, thereby generating the first sequence of light pulses.

The first sequence of light pulses can for example consist of a sequence of bursts, with each burst including a plurality of pulses.

Thus, the first manipulator may be capable of multiplying the repetition rate of the initial sequence of light pulses or of creating bursts of pulses.

Pulse bursts may have an envelope. Pulse bursts may be characterized by a pulse burst repetition rate, power cycle, inter-pulse temporal spacing, and the repetition rate of individual pulses within the pulse burst. In some embodiments, the inter-pulse temporal spacing may be shorter than 200 ps, such as lower than 100 ps, such as 10 ps. The inter-pulse temporal spacing may be larger than 1.5 times the width of the pulses in the burst, such as 5 times the width of the pulses in the burst, such as 10 times the width of the pulses in the burst, such as 20 to 25 times width of the pulses in the burst.

The splitter of the first manipulator may comprise optical fibers with different lengths for delaying the sub-sequences of light pulses. Each of the sub-sequence of light pulses may travel along a different optical fiber. Due to their different lengths, the pulses in the different sub-sequences are delayed with respect to each other.

In one embodiment, the second optical arm comprises at least one optical fiber, and preferably no manipulator, for propagating a second sequence of light pulses which corresponds to the initial sequence of light pulses. Thus, the second optical arm can provide a fiber link for providing optical communication between the pulse generator and the nonlinear optical element, so that the initial sequence of light pulses, then called the second sequence of light pulses, can be provided to the nonlinear optical element, in particular for broadband or supercontinuum generation. The second optical arm hence bypasses the first optical arm, whereby no manipulator is arranged in the second optical arm.

However, in one embodiment, the light source can comprise a second manipulator, where the second optical arm can comprise the second manipulator.

The second manipulator can be configured to generate the second sequence of light pulses such that the second sequence of light pulses comprises the same or less pulses per predetermined time period than the initial sequence of light pulses.

The second manipulator may comprise or consist of a pulse picker. The pulse picker may generate, from the initial sequence of light pulses with an initial repetition rate, the second sequence of light pulses with a repetition rate that is equal to or lower than the initial repetition rate. A pulse picker is a device that "picks" or selects some of the pulses in a sequence of pulses, thereby reducing (or keeping unaltered if all the pulses are selected) the repetition rate of the initial sequence of pulses. An acousto-optical or electro-optical modulator may be used as pulse picker.

The second manipulator, such as when comprising an acousto-optical or and electro-optical modulator, can also substantially block pulses, from the second optical arm, from being received by the nonlinear optical element, thus acting as an inline switch in the second optical arm.

In some embodiments, the pulse generator comprises at least one of a pulsed laser, a laser and an amplifier, a laser and a fiber amplifier.

In some embodiments pulse generator can have a fixed a repetition rate, while in other embodiments that pulse generator can have a variable repetition rate, wherein the initial number of pulses with the predetermined time period can be varied.

The nonlinear optical element can be a nonlinear optical fiber, in particular a microstructured optical fiber.

A microstructured fiber comprises an array of longitudinally extending features, where one or more of the features have a refractive index that is different from material surrounding the features. The array of features acts to guide the light propagated by the fiber. The microstructured optical fiber includes a core region and a cladding region, where the cladding region typically comprises the array of features, and the features typically comprise voids. Different types of microstructured fibers can operate by different physical mechanisms; for example, in some microstructured fibers the longitudinally extending array of features provides a photonic bandgap such that light cannot exist in the cladding and is therefore confined to the core; in other microstructure fibers the longitudinally extending array of features provides an index guiding mechanism for confining light to the core, akin to total internal reflection of a conventional fiber. Microstructured fibers may rely on other mechanisms as well. Microstructure fibers may have hollow or solid cores. A photonic bandgap type microstructured fiber, for example, often has a hollow core.

The microstructured optical fiber can be for example be a photonic bandgap fiber.

The predetermined time period can be equal to $n*T$, wherein n is a natural number and T is the inverse of the pulse repetition rate of the pulses of the initial sequence of light pulses.

The predetermined time period can be equal to $T/n$. In particular for embodiments where the first sequence of pulses comprises bursts of pulses, all pulses within a burst can be contained within a predetermined time period which is a fraction of T. n can be a natural number, e.g., $n=1, 2, 3, \ldots$ A multiport optical component (also referred to as a "MOC"), as that term is used herein, means an optical component having at least one input and at least two outputs or having at least one output and at last two inputs. Switches, combiners and splitters can be examples of a multiport optical component.

In some embodiments, the light source comprises at least a first MOC, the first MOC in optical communication with the optical arms an arranged or delivering optical pulses to the optical arms or for receiving optical pulse from the optical arms. The light source can include a second MOC, wherein the first MOC is in optical communication with the pulse generator and the optical arms for delivering optical pulses to the arms, and the second MOC is in optical communication with the optical arms and with the nonlinear optical element and receives pulses from the optical arms for delivery to the nonlinear optical element.

In some embodiments the light source generates broadband or supercontinuum light.

All features disclosed in this application can also be employed in conjunction with the above-mentioned light sources.

The invention also relates to an apparatus for illuminating a material sample, in particular for material processing, comprising a light source in accordance with the present invention, and a holder for a material sample, the holder being configured to hold the material such that, in use of the light source, the material sample is illuminated with broadband or supercontinuum light emitted from the nonlinear optical element of the light source.

The invention also relates to a system for optical analysis of an object and/or a system for optical measurement of at least one parameter of an object.

In some embodiments, the system for optical analysis and/or measurement comprises:
  a light source according to one of the embodiments, where
    the light source is arranged to illuminate the object;
  a detector for detecting light received from the illuminated objects; and an analyzer arranged to analyze the detected light and to derive therefrom at least one parameter of the object.

Broadband light sources, such as supercontinuum light sources, that provide a spectrally broad continuum source are useful in many systems for optical analysis and measurements, such as systems configured for optical coherence tomography (OCT), white-light interferometry, spectroscopy, optical frequency metrology, fluorescence microscopy, fluorescence lifetime measurements (FLIM), hyper-spectral imaging, flow cytometry, coherent anti-Stokes Raman scattering (CARS) microscopy and two-photon fluorescence microscopy.

In some embodiments, the system is a reflection mode measurement system arranged to measure light reflected from the analyzed object, such as a system based on white light interferometry, such as Optical Coherence Tomography (OCT). Advantageously, the system is based on time domain, frequency domain or swept source OCT.

In applications where the light interrogates sub-surface regions of the analyzed object, e.g. in OCT analysis of a patient's skin or eyes, the higher power provides that deeper parts of the object can be interrogated within the same duration or that faster analysis is provided In an embodiment, the system for optical analysis is configured for in vivo, ex vivo and/or in vitro measurements of parts of the human or animal body.

The system can be applied for different ophthalmic analysis and treatments, such as for diagnosis of Age-related macular degeneration (AMD), diabetic retinopathy or glaucoma. In some embodiments, the system is used for diagnosis in connection with treatment to correct refractive eye corrections, such as e.g. laser eye surgery to correct refractive eye conditions (LASIK). In some embodiments, the system is used for measuring the boundaries of the Bowman layer inside a human eye.

In some embodiments, the system is used for product characterization and/or sorting and/or quality inspection. The higher power of the broadband light source allows for larger interrogation volume defined from a larger interrogation area and/or depth and/or faster optical analysis of the products.

In an embodiment, the measuring system is used for analysis of semiconductor materials, e.g. nitride-containing materials, and quality inspection.

One advantage of the light source and the systems incorporating the disclosed light source is that the light source alone can provide the two operational modes (i.e. high and low-power modes). Prior art light sources would either be able to provide a high-power mode or a low-power mode, or would have significantly reduced life-time if the light source was operated simply by increasing the peak power in the pulses launched into the nonlinear optical element. The current invention may provide a versatile light source with extended lifetime.

The invention also relates to a method for optical measurement at least one parameter on an object to be measured. In some embodiments, the method for measuring comprises:
  providing a measurement system according to one of the embodiments;
  illuminating the object to be analyzed with at least part of the broadband spectrum generated by the light source of the measurement system;
  detecting light from said object by a detector; and
  analyzing the detected light to derive therefrom at least one parameter of the object.

In some embodiments, the illuminating and detection steps are executed simultaneously. This may e.g. be the case when the system is configured for OCT measurements or absorption spectroscopy where the object's optical response to the received light is instantaneous.

In some embodiments, the detection step is executed after the illuminating step. This may e.g. be the case when the system is configured for fluorescence measurements where the object's optical fluorescent response to the received light is slightly delayed.

In some embodiments, the method of analyzing comprises a bleaching step prior to the illuminating step, where the light source is operated in the high-power mode during the bleaching step and operated in the low-power mode during the illumination step. This can provide the advantage that an initial rapid bleaching of e.g. fluorophore markers attached to specific molecules in a biological sample.

The invention also relates to a spectroscopic system and/or an apparatus for carrying out spectroscopy on a sample, including a light source in accordance with the present invention for illuminating the sample with broadband or supercontinuum light and at least one detector for detecting light from the sample. The integration time of the detector preferably exceeds the time duration of a pulse and/or of a burst of pulses. The detector therefore does not "see" the structure of the pulse or burst. However, a burst as a whole is detectable. This is in particular advantageous for the detection of lower power signals. The integration time preferably does not include more than one burst. In some embodiments, the integration time can include more than one burst, that is, can be greater than the time between bursts. The integration time can exceed the time duration of a pulse but be less than the time duration of a burst of pulses.

The spectroscopic system for example can be used for analyzing dense or thick materials.

In some embodiments, the embodiments described above do not include the nonlinear optical element, such that pulses or bursts of pulses are output without being spectrally broadened by the nonlinear optical element.

BRIEF DESCRIPTION OF THE DRAWINGS

The invention is described in the following with reference to an exemplary embodiment shown in the accompanying drawings and by way of example only. The drawings show schematically.

DETAILED DESCRIPTION

Figure 1:
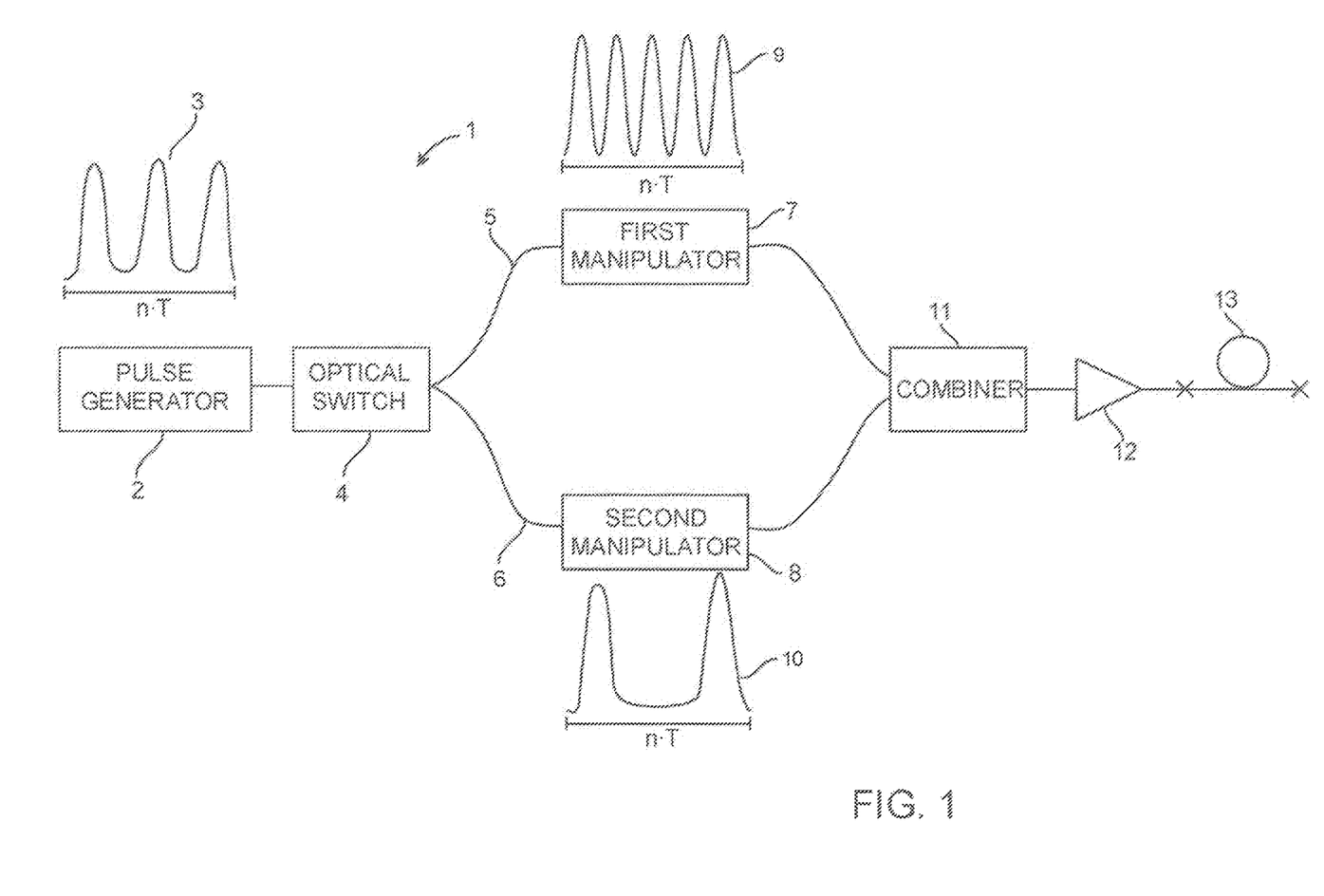
FIG. 1: An illustration of a light source that can operate in a low-power mode and a high-power mode.

FIG. 1 shows a broadband light source 1 which can operate in two different power modes. A pulse generator 2, such as, for example, a pulsed laser, a laser and an amplifier, or a laser and a fiber amplifier, generates an initial sequence of pulses 3 with a pulse width in the order of femtoseconds, picosecond or nanoseconds. The initial sequence of light pulses 3 comprises an initial number of light pulses within a predetermined time period n·T, where T, when the pulses are regular, can be the pulse period and is inversely proportional to the pulse repetition rate of the initial sequence of light pulses. The multiplier n is a natural number, such as 1, 2, 3, etc.

Following the pulse generator 2, a multiport optical component (MOC) 4, which in the embodiment shown in FIG. 1 comprises an optical switch, allows the user to send the initial sequence of light pulses 3 either through a first optical arm 5 or a second optical arm 6 by setting the switch accordingly.

Figure 2:
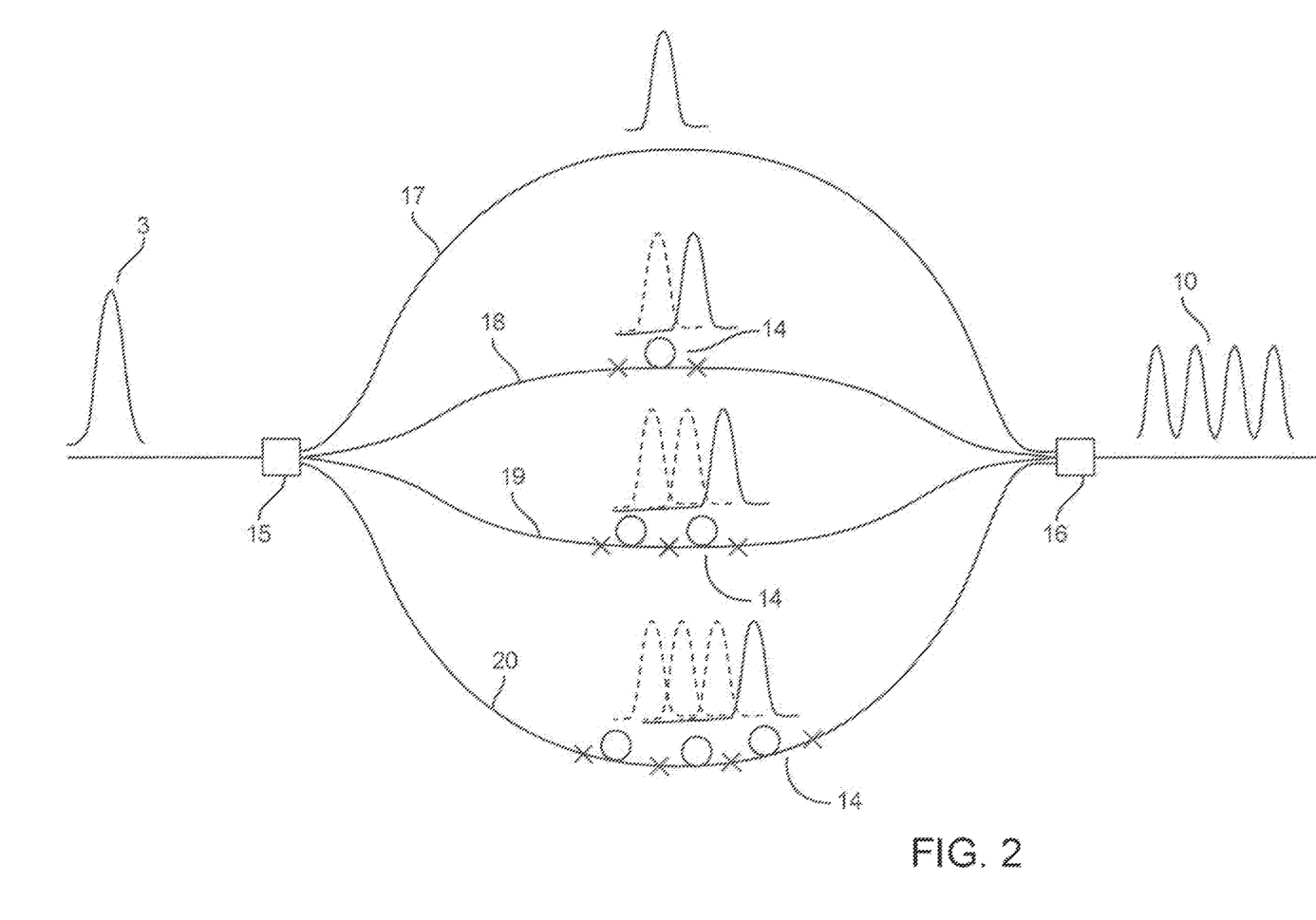
FIG. 2: An illustration of the first manipulator of the apparatus of FIG. 1.

The first optical arm 5 comprises a first manipulator 7 that may, for example, comprise a delay line device. This device will be described in detail with respect to FIG. 2. The device is capable of increasing the repetition rate over that of the initial sequence of light pulses 3 by increasing the number of pulses within the predetermined time period n·T with respect to the initial number of pulses. As illustrated in FIG. 2 and described in detail below, this device is also able to create the first sequence of light pulses 9 such that it comprises additional pulses, which may occur in bursts.

The second optical arm 6 comprises a second manipulator 8 that may for example comprise or consists of a pulse picker. A pulse picker is a device that "picks" or selects some of the pulses in a sequence of pulses, thereby reducing (or keeping unaltered if all the pulses are selected) the repetition rate of the initial sequence of pulses 3. A pulse picker is a standard optical device and an acousto-optical or electro-optical modulator can be used for this purpose. The second manipulator can create the second sequence of light pulses, schematically illustrated as indicated by reference numeral 10.

A MOC 11, which is located optically "downstream" from the "upstream" MOC 4, comprises, in the embodiment shown in FIG. 1, a combiner. The MOC/combiner 11 is in optical communication with both the output of the first optical arm 5 and the output of the second optical arm 6.

At least one optional amplifier 12 follows the combiner 11 to amplify the signal to a desired output level. The signal from the amplifier 12 is then provided to a nonlinear optical element 13 that broadens the optical pulses and forms output pulses with a broadband spectrum. The at least one amplifier 12 can also be two amplifiers.

The nonlinear optical element 13 is, for example, a nonlinear optical fiber, in particular a nonlinear microstructured optical fiber.

The output power of the generated supercontinuum can be dependent on the pulse repetition rate, or more generally on the number of pulses per time period that are provided to the nonlinear optical element 13. Through selection of the first optical arm 5 the user will thus select a high-power mode of the broadband light source 1, while through selection of the second optical arm 6 the user will select a low-power mode of the broadband light source 1.

The output power of the supercontinuum is in particular dependent on the pulse repetition rate when the peak power of the pulses used for supercontinuum generation remains in substance constant or below a certain level. The peak power or energy of selected pulse can be controlled, as discussed above. For example, in some embodiments, the pump power used for generating the initial sequence of light pulses 3 can be changed to keep the peak power of the pulses constant. Thus, the first sequence of light pulses 9 and the second sequence of light pulses 10 have a different number of light pulses within the predetermined time period, but the peak power of the pulses can be the same. This can be achieved by adjusting the pump power used for generating the initial sequence of light pulses in dependence of the setting of the optical switch. Alternatively, or additionally, the gain of an amplifier can be controlled, such as, for example, by controlling of the optical pumping of the amplifier, such that the peak power of pulses is controlled as desired.

As noted above, in some embodiments the peak power or energy of pulses can be controlled to remain substantially the same and/or to not to exceed a selected threshold. Control can be desirable where, as in the present invention, the number of pulses per unit time can vary. For example, the present invention can include one or more amplifiers. Amplifiers are typically optically pumped, such as by laser diodes, to provide for energy to transfer to the light signal to amplify the signal. Very often reducing the number of pulses amplified per unit time tend to increase the energy or peak power per pulse, as the amount of energy of optical pump power delivered over the time interval is now distributed over fewer amplified pulses.

Accordingly, one way to control the optical energy or peak power of a pulse, whether for compensating for variations due to the amplifier itself or responsive to other considerations, is to control the amplification process, such as, for example, controlling the pump laser or lasers pumping the amplifier(s). For example, the optical pump power can be reduced when fewer pulses are being amplified to compensate for the typical increase in amplified pulse energy or peak power.

A variable optical attenuator or a modulator, such as an AOM (acousto optic modulator) or and EOM (electro optic modulator) could be used, in some embodiments, to control the peak power or energy of pulses.

Control of the AOM or EOM could be in conjunction with the control of amplification.

The light source can be configured for sampling pulses, for example sampling pulses using a detector. Pulses to be delivered to the nonlinear optical element can be sampled prior to their delivery, and control can be responsive to the sampled pulse energy or peak power of pulses or of a burst of pulses (e.g., where a detector is not responsive to individual pulses). It is also possible to control the peak power or energy of the pulses responsive to a look up table, or to a formula or algorithm, or responsive to selected operation of the light source. Such control can be in conjunction with, or independent of, the aforementioned feedback control using a detector. For example, when pulses are directed to an optical arm that increases the number or repetition rate of pulses, the pulse energy or peak power of pulses can vary, at least in part, in a predictable manner. Where a pulse manipulator includes a pulse splitter, for example, the split pulses each have less energy or peak power than the pulse from which the pulses were split off. Thus, the pulse energy of peak power of pulses can be controlled, at least in part, responsive to the optical arm that is selected to propagate pulses. When pulses are split, amplification can be adjusted, such as by being increased. In some embodiments, pulse peak power or energy can be controlled responsive to a setting of the switch or switches, such as by adjusting the gain of a downstream optical amplifier to increase the pulse energy or peak power when pulses are switched so as to be split in a manipulator. Similarly, pulses can be controlled responsive to the operation of a manipulator or modulator. Depending the application, any pulses of the light source can be sampled and/or controlled, such as, for example, pulses from an optical source, the initial sequence of pulses, the first or second sequence of pulses, etc. The light source can include a controller (not shown) in appropriate communication with one or more of the aforementioned elements or components for providing the desired control.

FIG. 2 shows an example of how the first manipulator 7 can be constructed. The initial sequence of light pulses 3 (only one pulse of this sequence is shown in FIG. 2) enters the first manipulator 7 and is split by a pulse splitter 15 in at least two sub-sequences of light pulses. Four sub-sequences of light pulses are shown in FIG. 2 as the pulse splitter of FIG. 2 has one input and 4 outputs. Typical ratios of the input port:output port of the pulse splitter are 1:2, 1:4, 1:8, 1:16, etc.

In the device shown in FIG. 2 four optical arms 17, 18, 19, 20 are employed. In the first arm 17 no delay is inserted. In the second arm 18 one delay line 14 is inserted. In the third arm 19 two delay lines 14 are inserted, and in the fourth arm 20 three delay lines are inserted. A combiner 16 combines the signals originating from the different optical arms 17, 18, 19, 20. The resulting signal can be a sequence of a burst of pulses 10.

By varying the number of arms of the first manipulator 7 and the delays of the optical arms 17-20, it is possible to multiply the repetition rate of the initial sequence of light pulses 3 or to create bursts of pulses 10 as shown in FIG. 2. Amplifying such a signal and launching it into the nonlinear optical element 13 will give rise to a broadband spectrum with higher output power with respect to the output power generated by selecting the other port of the optical switch, i.e. the port that leads to the second manipulator 8. Therefore, a high-power mode is selected when the port of the optical switch leading to the first manipulator 7 is selected.

As explained above, the four optical arms 17, 18, 19, 20 could be formed by optical fibers of the same length, with one delay line inserted in the second optical arm 18, two delay lines inserted in series into the third optical arm 19, and three delay lines inserted in series into the fourth arm 20. Alternatively, the four arms could be formed by four different optical fibers of different lengths.

In one embodiment of the invention, the second manipulator is not present in FIG. 1, and is, for example, replaced with a length of optical fiber that is not capable of "picking" pulses and hence does alter the number of pulses within the predetermined time period. Hence the second sequence of pulses can essentially be the first sequence of pulses in terms of the number of pulses per the predetermined time period.

Figure 3:
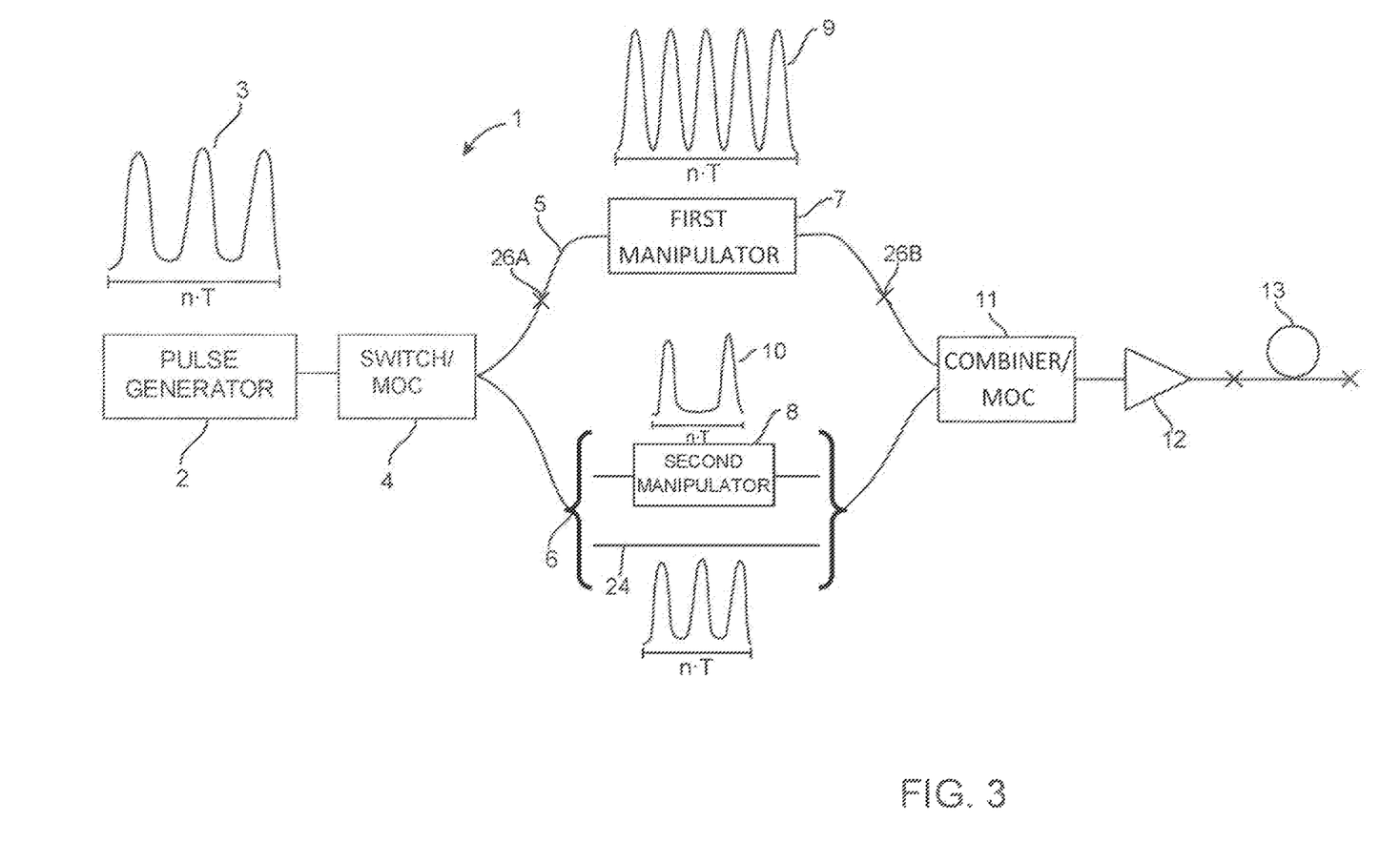
FIG. 3: Another illustration of a light source, showing variations on FIG. 1, that can operate in a low-power mode and in a high-power mode

FIG. 3 is now used as a basis to discuss various embodiments. FIG. 3 is identical to FIG. 1, except that it schematically illustrates the alternate embodiments noted above regarding the second optical arm 6 including a second manipulator 8 or a selected length of optical fiber 24.

In considering the embodiments below, each can be practiced in both the alternate embodiments where second optical arm includes and does not include the second manipulator.

As noted above, the switch 4 and combiner 11 shown in FIG. 1 can more generally each be considered a MOC.

In one embodiment, the upstream MOC 4 comprises a switch and the downstream MOC 11 comprises another switch. The upstream MOC switch 4 directs the initial sequence of pulses to either the first or second optical arm, and the downstream MOC switch 11 directs pulses from the first optical arm or the second optical arm to the nonlinear optical element. The switches are operated such that they both select the same optical arm.

In one embodiment the upstream MOC 4 comprises a splitter and the downstream MOC 11 comprises a switch.

In one embodiment the upstream MOC 4 comprises a switch and the downstream MOC comprises a combiner 11. This embodiment has already been discussed in more detail above.

In one embodiment, the upstream MOC comprises a splitter and the downstream MOC comprises a combiner.

In one variation on the foregoing, the first optical arm 5 comprises an in-line optical switch (not shown) having one input port and one output port and the second optical arm 6 comprises the second manipulator 8, where the second manipulator can also function as a switch. With reference to FIG. 3, such an inline switch could be located, for example, at either of locations 26A or 26B.

In another variation of the foregoing embodiment, both of the optical arms each comprise an in-line optical switch, each of the inline optical switches having an input port and an output port, and the switches can be operated in opposite fashion, that is, when one is on the other is off and vice versa. The second manipulator 8 may or may not be present. The inline switch in the second optical arm 6 could be located similarly as shown in the first optical arm.

Figure 4A:
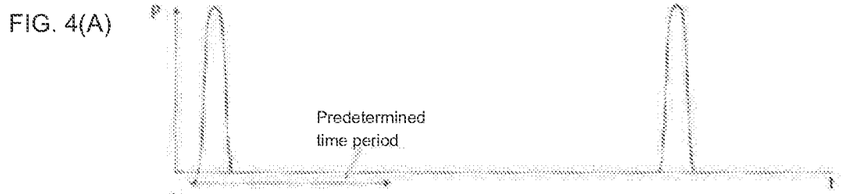
FIGS. 4(A)-4(C) and 5(A)-5(C): Schematically illustrated are sequences of light pulses that can occur according to certain practices of a light source according to the present invention.
Figure 4B:
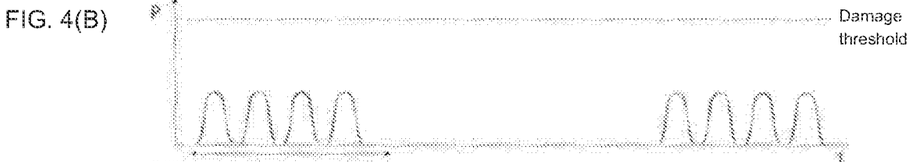
Figure 4C:
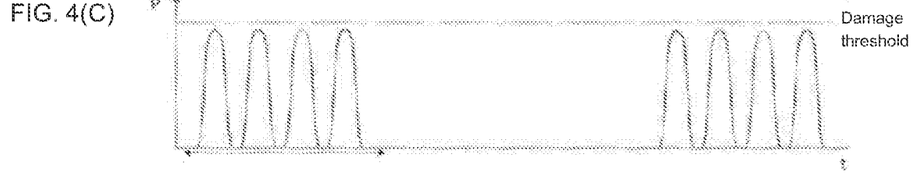

FIG. 4(A) illustrates a section of a pulse train generated by the pulse generator. The first manipulator (in this example having four optical arms) is arranged to generate a burst of four pulses from each pulse of the initial sequence of light pulses within the predetermined time period as shown in FIG. 4(B). The pulses of the burst can then be amplified with an amplifier arranged after the first manipulator as shown in FIG. 4(C) to be below the predefined maximum level, e.g. a damage threshold of the nonlinear optical element. The amplification can provide that the total optical power provided to the nonlinear optical element can be increased. Thereby a high-power supercontinuum can be provided without the use of high peak power that would quickly degrade the nonlinear optical element.

Figure 5A:
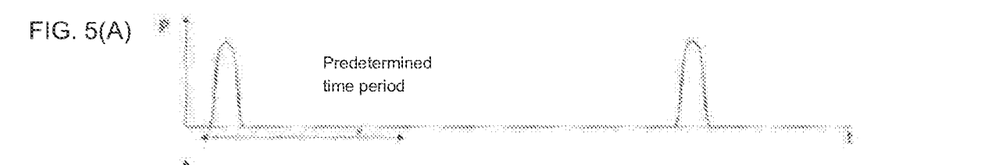
Figure 5B:
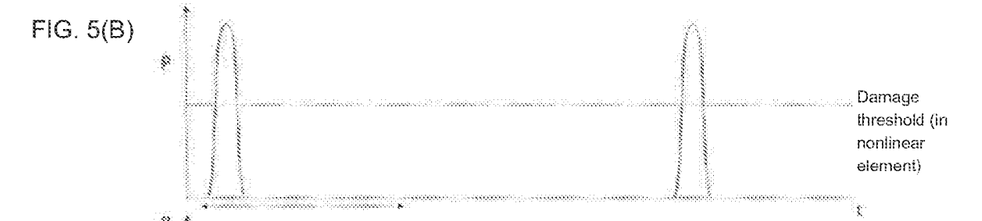
Figure 5C:
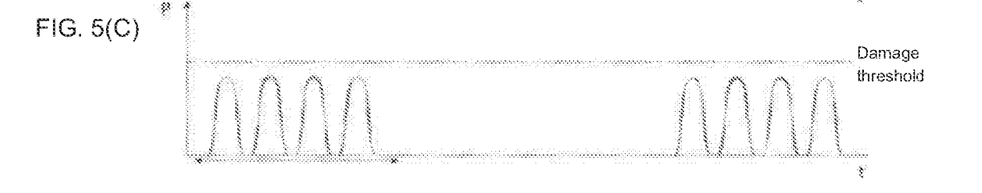

FIGS. 5(A)-5(B) show an alternative way of generating the train pulses shown in FIG. 4(C). namely, the initial sequence of light pulses shown in FIG. 5(A) can be amplified with an amplifier arranged after the pulse generator and prior to the first manipulator as shown in FIG. 5(B). Even though such sequence has a peak power above the predefined maximum level, i.e. the damage threshold of the nonlinear optical element, this will not be the case after the manipulator which will multiply the repetition rate of the initial sequence of light pulses shown in FIG. 5(C).

Unless clearly indicated as otherwise, or unless clearly apparent to the person of ordinary skill that such a combination is not intended or not workable, all features discussed above in conjunction with a detailed description of FIGS. 1-5 are to be considered within the scope of the invention to be included in the additional embodiments discussed above, independently or in any combination with each other.

The term "light" herein does not only refer to visible light, but also to light in the non-visible wavelength regimes, including, for example, light in the infrared (IR) or ultraviolet (UV) wavelength regime.

The broadband spectrum generated by the nonlinear optical element is usually a continuous spectrum, but it can also be a non-continuous spectrum. For example, a spectrum can include very closely spaced bands of wavelengths.

The broadband spectrum generated in the nonlinear fiber may also be a supercontinuum spectrum.

LIST OF REFERENCE SIGNS 1 light source
2 pulse generator
3 initial sequence of light pulses
4 multiport optical component (e.g., optical switch in FIG. 1)
5 first optical arm 6 second optical arm
7 first manipulator
8 second manipulator
9 first sequence of light pulses
10 second sequence of light pulses
11 multiport optical component (e.g., optical combiner in FIG. 1)
12 amplifier
13 nonlinear optical element
14 delay line
15 pulse splitter
16 pulse combiner
17 optical arm
18 optical arm
19 optical arm
20 optical arm
24 length of optical fiber
26A possible location for insertion of inline switch
26B possible location for insertion of inline switch

The invention claimed is:

1. A light source, comprising:
a pulse generator for providing an initial sequence of light pulses, the initial sequence of light pulses comprising an initial number of light pulses within a predetermined time period,
first and second optical arms, for propagating, respectively, first and second sequences of light pulses, each derived from the initial sequence of light pulses,
wherein the first optical arm comprises a first manipulator configured to generate the first sequence of light pulses from the initial sequence of light pulses, the first sequence of light pulses having a first number of light pulses within the predetermined time period, wherein the first number is higher than the initial number, wherein the first manipulator comprises a plurality of optical fibers,
wherein the second sequence of light pulses has a second number of light pulses within the predetermined time period, wherein the second number is equal to or lower than the initial number,
wherein the light source further comprises a nonlinear optical element arranged to receive the first sequence of light pulses or the second sequence of light pulses, and
an optical switch arranged to switch either the first sequence of light pulses or the second sequence of light pulses for reception by the nonlinear optical element,
wherein the light source is a broadband light source.

2. The light source of claim 1,
wherein the first manipulator is configured to generate, from the initial sequence of light pulses with an initial repetition rate, the first sequence of light pulses having a repetition rate that is higher than the initial repetition rate.

3. The light source of claim 1,
wherein the first manipulator is configured to generate a burst of pulses comprising at least two pulses with a time delay in between the at least two pulses from a single pulse of the initial sequence of light pulses.

4. The light source of claim 1,
wherein the light source comprises at least one amplifier arranged upstream of the nonlinear optical element.

5. The light source of claim 4,
wherein the light source comprises a controller in communication with the optical switch and the amplifier, where the controller is configured for controlling the amplification of pulses depending on the setting of the optical switch, such that pulses of the first sequence are amplified more than pulses of the second sequence.

6. The light source of claim 5,
wherein the controller provides that the amplification of optical pulses in the first or second sequence of pulses such that the peak power of the pulses in the respective sequence of pulses remains below a predefined maximum level.

7. The light source of claim 4,
wherein the at least one amplifier is arranged downstream of the optical switch and upstream of the nonlinear optical element, or after the first manipulator, or after the pulse generator and prior to the first manipulator.

8. The light source of claim 1,
wherein the second optical arm comprises a second manipulator configured to generate the second sequence of light pulses from the initial sequence of light pulses,
wherein the only optical paths from the optical switch to the nonlinear optical element travel through the first or second optical arms.

9. The light source of claim 8,
wherein the second manipulator comprises a pulse picker.

10. The light source of claim 1,
wherein the second optical arm comprises at least one optical fiber for guiding the second sequence of light pulses, which second sequence corresponds to the initial sequence of light pulses.

11. The light source of claim 1,
wherein the optical switch is in optical communication with the first and second optical arms and is arranged to selectively provide the initial sequence of light pulses to either the first optical arm or the second optical arm.

12. The light source of claim 1,
wherein the optical switch is in optical communication with the first and second optical arms and is configured to receive the first sequence of light pulses and the second sequence of light pulses and to selectively provide either the first sequence of light pulses or the second sequence of light pulses to the nonlinear optical element.

13. The light source of claim 1,
wherein said optical switch has an input and an output and is arranged with one of said optical arms for switching light of only that optical arm.

14. The light source of claim 1,
wherein the nonlinear optical element comprises a nonlinear optical fiber.

15. The light source of claim 1,
wherein the nonlinear optical element comprises a microstructured optical fiber.

16. The light source of claim 1,
where the first and second sequences of light pulses generate a broadband output or a supercontinuum when propagating through the nonlinear optical element.

17. The light source of claim 1,
wherein the light source can operate in a high power mode or a low power mode depending on a setting of the switch,
where the high power mode operation is provided when the switch setting is such that the nonlinear optical element receives the first sequence of light pulses, and
where the low power mode operation is provided when the switch setting is such that the nonlinear optical element receives the second sequence of light pulses.

18. A light source comprising a nonlinear optical element for supercontinuum generation, where the light source is capable of switching between operating in a high power mode and a low power mode while mitigating accelerated degradation of the nonlinear optical element in the high power mode, the light source comprising:
- a pulse generator for providing an initial sequence of light pulses, the initial sequence of light pulses comprising an initial number of light pulses within a predetermined time period,
- first and second optical arms, for propagating, respectively, first and second sequences of light pulses, each derived from the initial sequence of light pulses,
- wherein the first optical arm comprises a first manipulator configured to generate the first sequence of light pulses from the initial sequence of light pulses, the first sequence of light pulses having a first number of light pulses within the predetermined time period, wherein the first number is higher than the initial number, wherein the first manipulator comprises a plurality of optical fibers,
- wherein the second sequence of light pulses has a second number of light pulses within the predetermined time period, wherein the second number is equal to or lower than the initial number,
- an optical switch arranged to switch either the first sequence of light pulses or the second sequence of light pulses for reception by the nonlinear optical element,
- at least one amplifier arranged upstream of the nonlinear optical element,
- a controller in communication with the optical switch and the amplifier; where the controller is configured for controlling the amplification of pulses depending on the setting of the optical switch, such that pulses of the first sequence are amplified more than pulses of the second sequence whereby the high order mode is provided while mitigating accelerated degradation of the nonlinear optical element, wherein the light source is a broadband light source.

19. The light source of claim 18,
wherein the second optical arm comprises a second manipulator configured to generate the second sequence of light pulses from the initial sequence of light pulses,
wherein the only optical paths from the optical switch to the nonlinear optical element travel through the first or second optical arms.

* * * * *